United States Patent [19]
Kumar

[11] Patent Number: 5,480,220
[45] Date of Patent: Jan. 2, 1996

[54] METHOD FOR INHIBITING WHEEL SLIP IN AN ELECTRIC ALTERNATING CURRENT INDUCTION MOTOR POWERED VEHICLE

[75] Inventor: Ajith K. Kumar, Erie, Pa.

[73] Assignee: General Electric Company, Erie, Pa.

[21] Appl. No.: 461,921

[22] Filed: Jun. 5, 1995

Related U.S. Application Data

[63] Continuation of Ser. No. 935,610, Aug. 26, 1992, abandoned.

[51] Int. Cl.$^6$ ........................................ B60K 1/00
[52] U.S. Cl. ........................ 303/151; 303/20; 180/65.1
[58] Field of Search ............................... 303/100, 111, 303/112, 20, 15, 3.95, 110; 180/65.1–65.8, 6.5, 197; 318/86, 87, 90, 71, 52

[56] References Cited

U.S. PATENT DOCUMENTS

| | | | |
|---|---|---|---|
| 3,561,557 | 2/1971 | Magnuson et al. | 180/65.2 |
| 3,720,863 | 3/1973 | Ringland et al. | 180/6.5 |
| 3,866,702 | 2/1975 | Eastham | 180/65.8 |
| 4,075,538 | 2/1978 | Plunket | 180/197 |
| 4,444,285 | 4/1984 | Stewart et al. | 180/65.4 |
| 4,780,650 | 10/1988 | Miyazaki et al. | 318/71 |
| 4,825,131 | 4/1989 | Nozaki et al. | 180/197 |
| 4,896,090 | 1/1990 | Balch et al. | 318/71 |

Primary Examiner—Matthew C. Graham
Attorney, Agent, or Firm—Ann M. Agosti; Marvin Snyder

[57] ABSTRACT

A method for inhibiting wheel slip in an electric alternating current induction motor powered vehicle responsive to a frequency command signal and to a signal representative of actual motor torque for establishing a corresponding excitation frequency for the induction motor develops the frequency command signal from a torque command signal. The method compares the torque command signal to selectively variable relatively positive and negative torque command limits to develop a torque reference signal. The magnitude of the signal corresponding to actual motor torque is subtracted from the magnitude of the torque reference signal to develop a torque error signal, which error signal is then converted to a corresponding torque regulator signal. The torque regulator signal is summed with the torque reference signal to develop a motor torque signal and the motor torque signal is then converted to a corresponding frequency command signal. This method assures that motor torque does not exceed the torque which would result in slipping or sliding and thus prevents the initiation of a wheel slip or slide.

11 Claims, 4 Drawing Sheets

METHOD FOR INHIBITING WHEEL SLIP IN AN ELECTRIC ALTERNATING CURRENT INDUCTION MOTOR POWERED VEHICLE

This application is a continuation of application Ser. No. 07/935,610 filed Aug. 26, 1992, now abandoned.

BACKGROUND OF THE INVENTION

The present invention relates to control systems for alternating current induction motor powered traction vehicles such as locomotives or transit vehicles and, more particularly, the invention relates to a method for controlling such a vehicle in a manner to avoid wheel slip or slide during propulsion and electrical retarding, respectively.

Locomotives and transit vehicles as well as other large traction vehicles are commonly powered by electric traction motors coupled in driving relationship to one or more axles of the vehicle. Locomotives and transit vehicles generally have at least four axle wheel sets per vehicle with each axle-wheel set being connected via suitable gearing to the shaft of a separate electric motor commonly referred to as a traction motor. In the motoring mode of operation, the traction motors are supplied with electric current from a controllable source of electric power (e.g., an engine-driven traction alternator) and apply torque to the vehicle wheels which exert tangential force or tractive effort on the surface on which the vehicle is traveling (e.g., the parallel steel rails of a railroad track), the parallel steel rails of a railroad track), thereby propelling the vehicle in a desired direction along the right of way. Alternatively, in an electrical braking mode of operation, the motors serve as axle-driven electrical generators; torque is applied to their shafts by their respectively associated axle-wheel sets which then exert braking effort on the surface, thereby retarding or slowing the vehicle's progress. In either case, good adhesion between each wheel and the surface is required for efficient operation of the vehicle.

It is well known that maximum tractive or braking effort is obtained if each powered wheel of the vehicle is rotating at such an angular velocity that its actual peripheral speed is slightly higher (motoring) or slightly lower (braking) than the true vehicle speed (i.e., the linear speed at which the vehicle is traveling, usually referred to as "ground speed" or "track speed"). The difference between wheel speed and track speed is referred to as "slip speed." There is a relatively low limit value of slip speed at which peak tractive or braking effort is realized. This value, commonly known as maximum "creep speed," is a variable that depends on track speed and rail conditions. So long as the maximum creep speed is not exceeded, slip speed is normal and the vehicle will operate in a stable microslip or creep mode. If wheel-to-rail adhesion tends to be reduced or lost, some or all of the vehicle wheels may slip excessively, i.e., the actual slip speed may be greater than the maximum creep speed. Such a wheel slip condition, which is characterized in the motoring mode by one or more spinning axle-wheel sets and in the braking mode by one or more sliding or skidding axle-wheel sets, can cause accelerated wheel wear, rail damage, high mechanical stresses in the drive components of the propulsion system, and an undesirable decrease of tractive (or braking) effort.

Many different systems are disclosed in the prior art for automatically detecting and recovering from undesirable wheel slip conditions.

Typically, differential speeds between axle-wheel sets or rate of change of wheel speed or a combination of these two measurements are used to detect wheel slip. Speed is monitored and if found to exceed predetermined differentials or rates of change, power to the motors is reduced in an attempt to bring speed to a value at which traction is regained. The disadvantage of such systems of wheel slip control is that the wheels have to exceed some predetermined speed or acceleration, i.e., wheel slip has to occur before corrective action takes place. This results in a loss of tractive effort and generally requires that the wheel speed drop below the aforementioned desirable creep speed before traction is regained. Accordingly, it is desirable to have a control system which avoids wheel slip or slide while maximizing tractive or braking effort.

SUMMARY OF THE INVENTION

Among the several objects of the present invention may be noted the provision of a control method for an AC electric traction motor vehicle which provides faster response when wheel-to-rail adhesion is reduced and which enhances the available tractive and braking effort. In an exemplary form, the invention is illustrated as a method for inhibiting wheel slip in an electric alternating current induction motor powered vehicle, the vehicle including electric power control means responsive to a frequency command signal and to a signal representative of actual motor torque for establishing a corresponding excitation frequency for the induction motor. The frequency command signal is developed from a torque command signal by comparing the torque command signal to selectively variable relatively positive and negative torque command limits to develop a torque reference signal limited to a maximum value corresponding to a respective one of the positive and negative limits. The signal representative of actual motor torque is subtracted from the torque reference signal to develop a torque error signal. The torque error signal is converted to a corresponding torque regulator signal which is then summed with the torque reference signal to develop a motor torque signal. The motor torque signal is finally converted to a corresponding frequency command signal.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
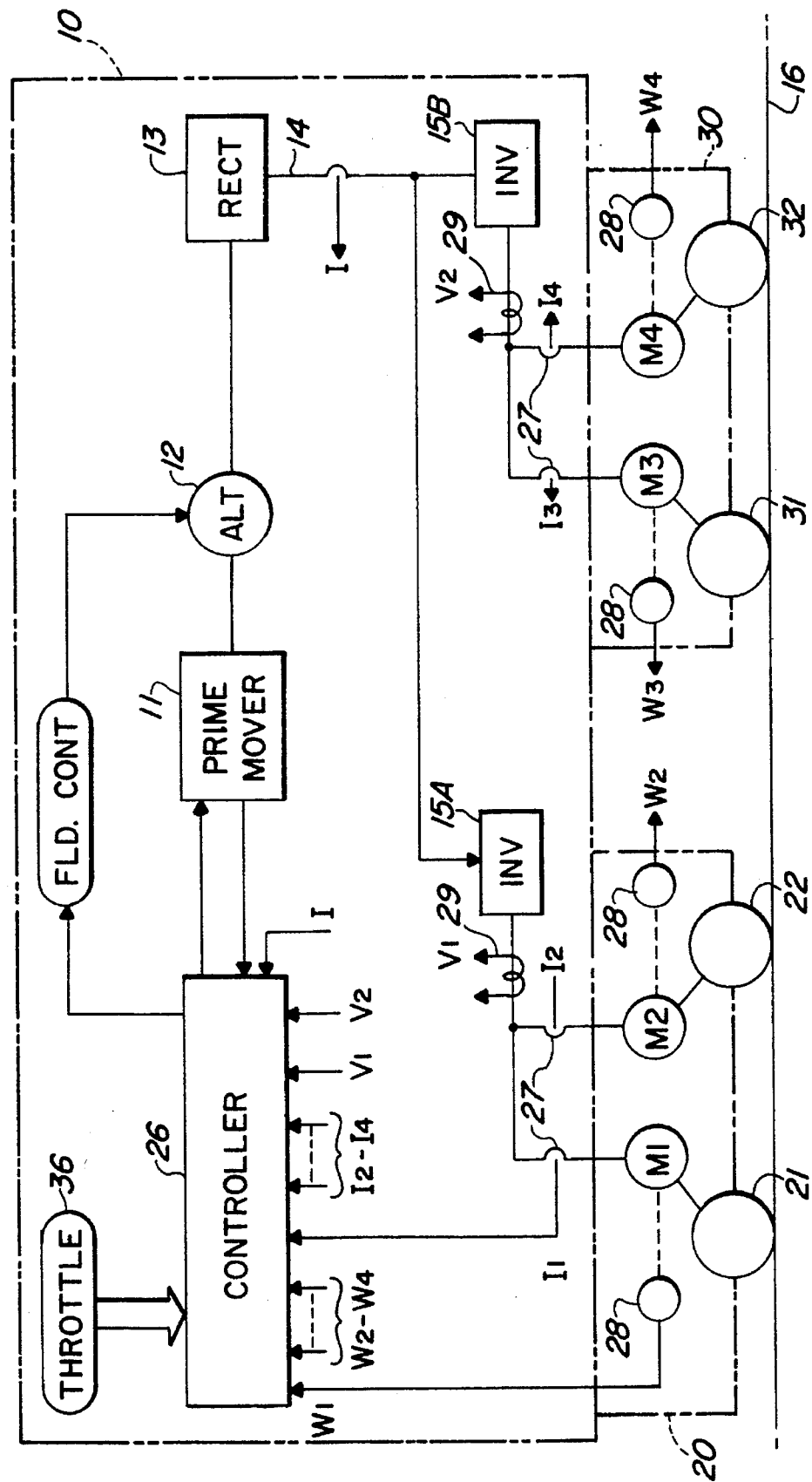
FIG. 1 is a simplified block diagram of the principal components of a propulsion system for a diesel-electric locomotive with which the present invention may be used.

The present invention may be utilized in various types of alternating current (AC) induction motor powered vehicles such as, for example, transit cars and locomotives. For purpose of illustration, the invention is described herein as it may be applied to a locomotive. The propulsion system 10 of FIG. 1 includes a variable speed prime mover 11 mechanically coupled to a rotor of a dynamo electric machine 12 comprising a 3-phase alternating current (AC) synchronous generator or alternator. The 3-phase voltages developed by alternator 12 are applied to AC input terminals of a conventional power rectifier bridge 13. The direct current (DC) output of bridge 13 is coupled via DC link 14 to a pair of controlled inverters 15A and 15B which inverts the DC power to AC power at a selectable variable frequency. The AC power is electrically coupled in energizing relationship to each of a plurality of adjustable speed AC traction motors M1 through M4. Prime mover 11, alternator 12, rectifier bridge 13 and inverters 15A, 15B are mounted on a platform of the traction vehicle 10, illustrated as a 4-axle diesel-electric locomotive. The platform is in turn supported on two trucks 20 and 30, the first truck 20 having two axle-wheel sets 21 and 22 and the second truck 30 having two axle-wheel sets 31 and 32.

Each of the traction motors M1–M4 is hung on a separate axle and its rotor is mechanically coupled, via conventional gearing, in driving relationship to the associated axle-wheel set. In the illustrative embodiment, the two motors M1 and M2 are electrically coupled in parallel with one another and receive power from inverter 15A while motors M3 and M4 are coupled to inverter 15B. However, in some instances, it may be desirable to provide an inverter for each motor or to couple additional motors to a single inverter. Suitable current transducers 27 and voltage transducers 29 are used to provide a family of current and voltage feedback signals, respectively, representative of the magnitudes of current and voltage in the motor stators. Speed sensors 28 are used to provide speed signals representative of the rotational speeds W1–W4 in revolutions per minute (RPM) of the motor shafts. These speed signals are readily converted to wheel speed in a well known manner. For simplicity, only single lines have been indicated for power flow although it will be apparent that the motors M1–M4 are typically three phase motors so that each power line represents three lines in such applications.

The magnitude of output voltage and current supplied to rectifier bridge 13 is determined by the magnitude of excitation current supplied to the field windings of the alternator 12. The excitation current is set in response to an operator demand (Throttle 36) for vehicle speed by the controller 26 which is in turn responsive to actual speed as represented by signals W1–W4. The controller 26 converts the speed command to a corresponding torque command for use in controlling the motors M1–M4. Since AC motor torque is proportional to rotor current and air gap flux, these quantities may be monitored or, more commonly, other quantities such as applied voltage, stator current and motor RPM may be used to reconstruct motor torque in controller 26. A more detailed analysis of such techniques is given in U.S. Pat. No. 4,243,927 and in a paper published in IEEE Transactions on Industry Applications, Vol. IA-13, No. 1, Jan. 1977, the IEEE entitled Inverter-Induction Motor Drive For Transit Cars by Plunkett and Plette, the disclosure of each of which is incorporated by reference.

In an electrical braking or retarding mode of operation, inertia of the moving vehicle is converted into electrical energy by utilizing the traction motors as generators. Motor voltage and current are controlled to set a desired braking effort.

In either motoring or braking, it is desirable to control the motors so as to minimize slip, i.e., in the illustrative locomotive system to minimize slipping of the wheels on the rail 16. Slippage is an indication of a lack of traction and therefore undesirable in either motoring or braking. For a detailed description of wheel slip in a traction vehicle application, reference may be made to U.S. Pat. No. 4,896,090 to Balch et al and assigned to General Electric Company. While this patent describes a DC motor system, the concerns and comments regarding wheel slip are substantially the same.

As previously discussed, prior art systems have generally relied upon detection of a wheel slip condition before implementing corrective action. The present invention is intended to inhibit wheel slip while permitting the vehicle to operate at maximum tractive effort. More particularly, this invention controls the synchronous speed of the motors M1–M4 such that the speed is not allowed to exceed a predetermined speed which is based upon a differential speed or a rate of change of speed.

Figure 2:
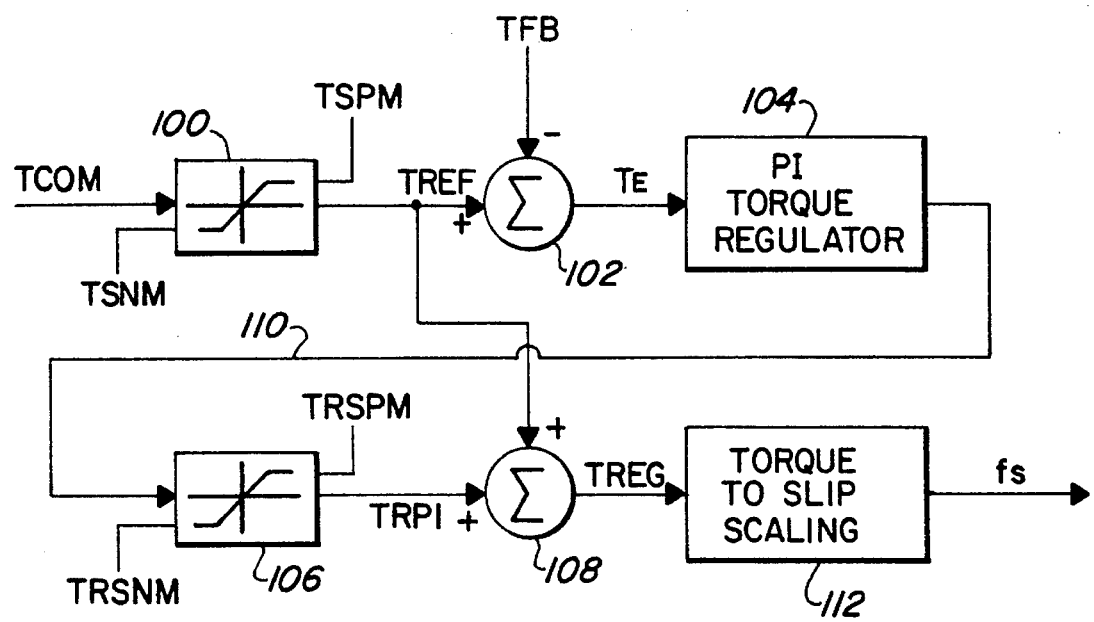
FIG. 2 is a simplified functional block diagram of a wheel slip system implementing the method of the present invention.

FIG. 2 is a functional block diagram of a wheel slip regulation system in accordance with the present invention. A torque command signal $T_{COM}$, developed from a speed command signal as described above, is applied to a limit circuit, block 100, which limits the maximum magnitude, positive and negative, of the $T_{COM}$ signal to predetermined slip limit values. The positive limit value is set at a torque slip positive maximum, $T_{SPM}$, while the negative limit is set at a torque slip negative maximum, $T_{SNM}$. Both of these limit values are dynamic values and their development is described with reference to FIGS. 3 and 4.

The $T_{COM}$ signal as may be modified by the circuit block 100 and developed as an output signal thereof is referred to as the torque reference signal, $T_{REF}$. This signal $T_{REF}$ is coupled to a summing block 102 which is the first block in a generally conventional torque regulator circuit which further includes a proportional plus integral (PI) regulator 104, a limit circuit 106 and a summing circuit 108. The $T_{REF}$ signal is summed with a torque feedback signal $T_{FB}$ in block 102, the difference between the $T_{REF}$ and $T_{FB}$ signals representing a torque error, i.e., a difference between commanded torque and actual motor torque. Block 102 thus develops a torque error signal $T_E$ which is applied to a conventional PI regulator 104, it being noted that regulator 104 can take other forms such as an amplifier with appropriate compensation. The regulator 104 develops a torque regulator signal on line 110 which is applied to another slip limit circuit 106, similar to circuit 100. The circuit 106 limits the maximum excursions of the torque regulator signal to predetermined variable limit values corresponding to a torque regulator slip positive maximum limit and a torque regulator slip negative maximum limit, designated $T_{RSPM}$ and $T_{RSNM}$, respectively. Each of these limit values is described below with reference to FIGS. 3 and 4. The signal output from circuit 106 is merely an amplitude limited version of the torque regulator signal on line 110 and is designated $T_{RPI}$.

The regulator signal $T_{RPI}$ is coupled to summing circuit 108 where it is summed with the torque reference signal $T_{REF}$. Note that for the case where the regulator 104 comprises an amplifier with compensation, if the actual motor torque is equal to the commanded torque, the output signal $T_{RPI}$ will be zero and the output from summing circuit 108 will equal the torque reference signal $T_{REF}$. In FIG. 2, the output signal from circuit 108 is designated as the torque regulator output signal $T_{REG}$.

The signal $T_{REG}$ represents a command to be applied to control the inverters 15A and 15B so as to provide excitation at a frequency to drive the motors M1–M4 at a desired speed. It is well known that AC induction motor torque is proportional to the square of motor voltage divided by the square of excitation frequency and multiplied by slip frequency at low values of slip frequency. It is further known that rotor current is proportional to motor voltage divided by excitation frequency and multiplied by slip frequency. From these torque versus speed relationship can be established by controlling slip frequency. Conversely, if slip frequency is held constant, one of either speed or torque can be controlled by varying the other of these factors.

The block 112 is connected to receive the $T_{REG}$ signal and is adapted to convert this torque signal to a corresponding slip frequency fs. The relationship implemented can be stated as:

$$T_{REG} = K \left( \frac{V}{f} \right)^2 \times fs,$$

where V is motor voltage f is stator excitation frequency and K is a constant which may vary between different types of motors. The block 112 may be implemented in hardwired circuits or in a microcomputer, both implementations being well known in the art. The output signal fs from block 112 is coupled to the inverter 15 or, more precisely, to controller 26 which provides firing signals to the electric switches in the inverters for developing motor excitation voltage at a desired frequency to produce the commanded slip and corresponding torque. Methods of implementing such functions are well known as illustrated by Tutorial Report 83-5 prepared for the Wisconsin Electric Machines and Power Electronics Consortium conference on Vector Control and Field Orientation by Novotny and Lipo of the University of Wisconsin in 1983. Microprocessor controls for AC motor drives are reported extensively in the 1979 IEEE International Conference on Electrical Variable Speed Drive, particularly in papers by Humblet et al and Murphy et al.

Figure 3:
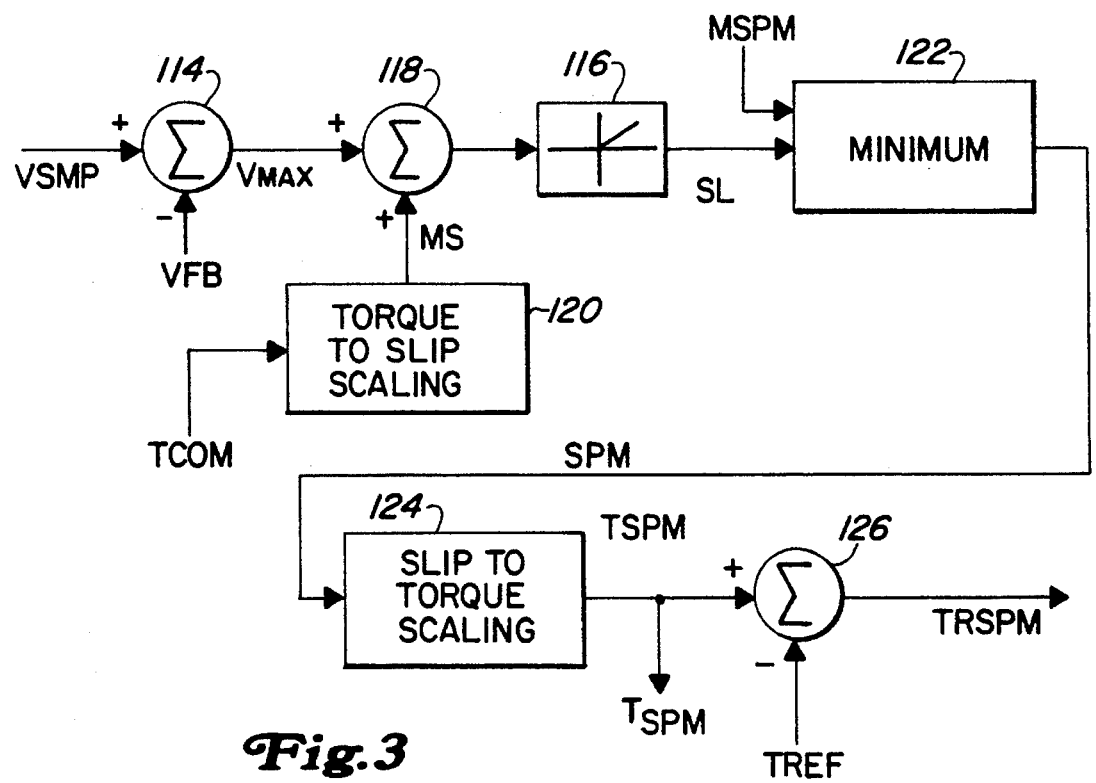
FIGS. 3 and 4 are functional block diagrams of one method for developing positive and negative clamp values, respectively, for use with the system of FIG. 1.
Figure 4:
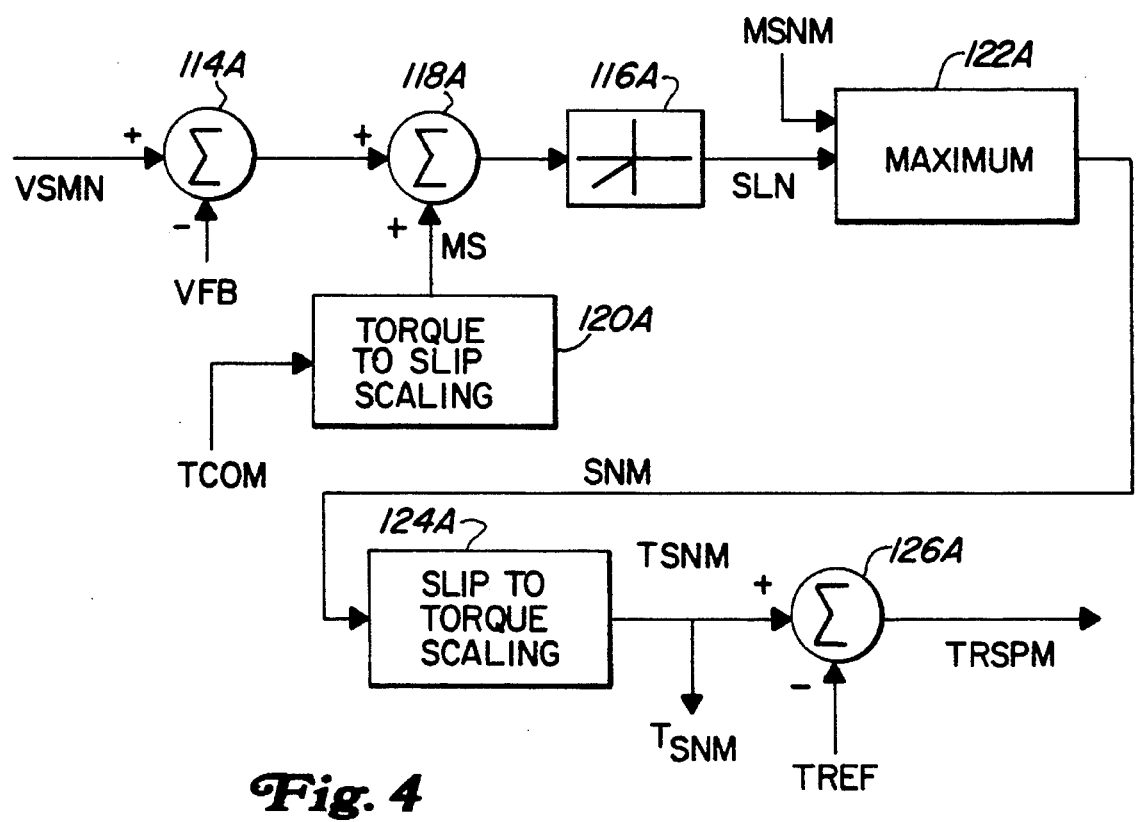

Referring to FIGS. 3 and 4, there are shown functional block diagrams for developing the torque slip limits $T_{SPM}$, $T_{SNM}$, $T_{RSPM}$ and $T_{RSNM}$. In FIG. 3, a car speed maximum signal representative of a maximum allowable vehicle speed and designated $V_{SMP}$ is summed with an actual speed feedback signal $V_{FB}$ in summing circuit 114. The development of the $V_{SMP}$ signal is described hereinafter in the discussion of FIG. 5A. $V_{FB}$ is obtained from the speed transducers 27. The difference between $V_{SMP}$ and $V_{FB}$ is the speed error signal or maximum allowable wheel slip speed $V_{MAX}$. Note that both $V_{SMP}$ and $V_{FB}$ are scaled to represent the controlled values, e.g., motor speed rather than wheel RPM since the control function is applied to regulate motor excitation. The output of circuit 114 is coupled to summing junction 118 in FIG. 3 where the $V_{MAX}$ signal is summed with the desired motor slip, i.e., the slip required to generate the desired or commanded torque. The motor slip is determined as described above from the torque command $T_{COM}$ as a function of motor voltage and stator frequency. The torque command is coupled to block 120 which is similar to block 112 and converts the signal $T_{COM}$ to a motor slip frequency signal $M_S$. Block 118 sums the signal $M_S$ with the $V_{MAX}$ signal and couples the resultant slip limit signal to clamp circuit 116 which clamps all negative values to zero and passes all positive values without change. FIG. 4, which parallels FIG. 3 in all aspects, provides the inverse or negative limits which are used when the vehicle is slowing or operating in an electrical retarding mode. In FIG. 4, car speed minimum limit $V_{SMN}$ is summed with the actual vehicle speed $V_{FB}$ in circuit 114A and clamp circuit 116A clamps the resultant speed difference signal to zero for any positive value. The clamped, if necessary, slip signal selector circuit 122 in FIG. 3 or to maximum signal selector circuit 122A in FIG. 4. A second input to circuit 122 is a motor slip positive maximum limit signal $M_{SPM}$ (Motor slip negative maximum $M_{SNM}$ is input to 122A in FIG. 4.) The circuit 122 selects the minimum (or maximum) of these two input signals, and provides a corresponding output signal $S_{PM}$ (or $S_{NM}$) representing the maximum positive (or negative) slip limit. The motor slip positive and negative maximum limit signals $M_{SPM}$ and $M_{SNM}$ represent motor slip limits to protect the motors from damage and are generally constant values provided by the motor manufacturer.

The signal $S_{PM}$ is coupled to scaling circuit 124 which converts the slip limit to a torque limit using the same conversion relationships implemented in blocks 112 and 120. The output of block 124 is the torque slip positive maximum signal $T_{SPM}$ coupled to block 100 in FIG. 2. In block 126 of FIG. 3, the $T_{SPM}$ signal is summed with the torque reference signal $T_{REF}$ (from FIG. 2) and the difference becomes the torque regulator slip positive maximum signal $T_{RSPM}$ which sets the positive limit in block 106.

Referring to FIG. 4, each of the blocks in this figure correspond to one of the above described blocks in FIG. 3. The distinction is that the system of FIG. 4 establishes the negative limits used in electrical braking whereas the system of FIG. 3 established the positive limits used in propulsion. Each of the blocks in FIG. 4 have been labeled with a reference number corresponding to a similar block in FIG. 3, but with an 'A' suffix for distinction. Since the blocks of FIG. 4 correspond to blocks in FIG. 3, no further description need be provided.

Figure 5A:
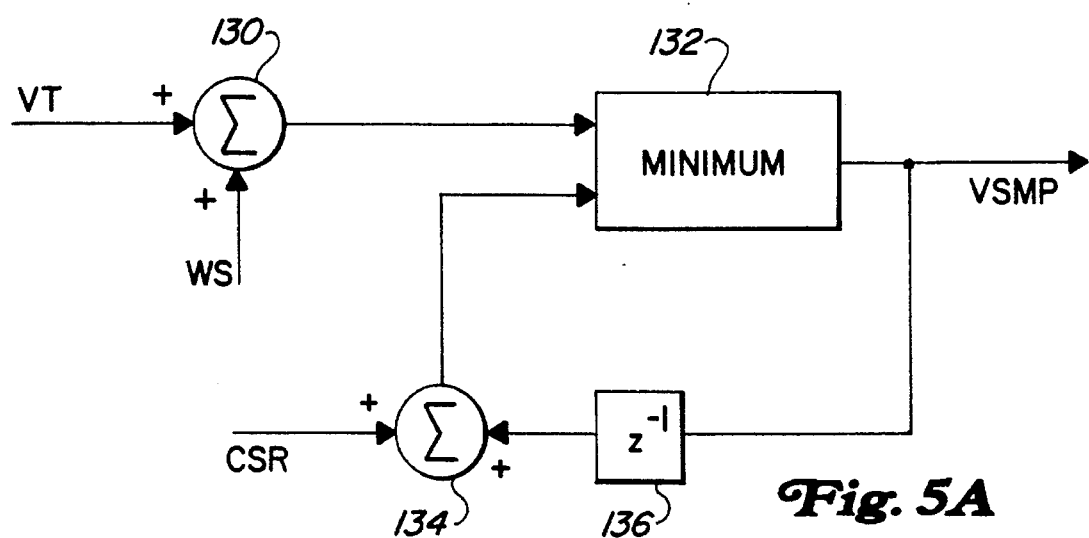
FIGS. 5A and 5B are functional block diagrams illustrating one method of developing vehicle speed limits for use in the present invention.
Figure 5B:
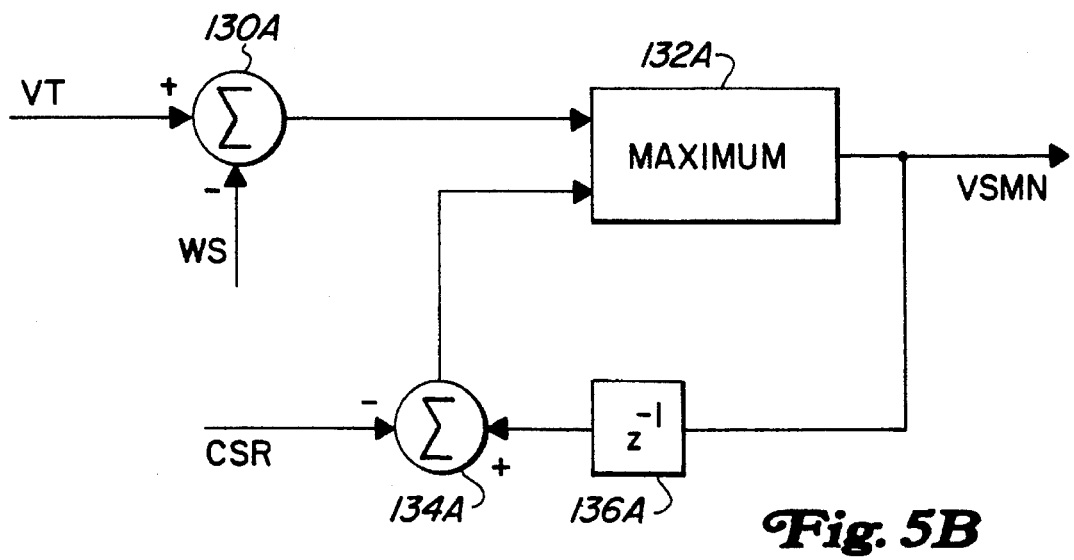

Referring now to FIGS. 5A and 5B, there are shown the respective systems for developing the car speed maximum and car speed minimum signals $V_{SMP}$, $V_{SMN}$ used in FIGS. 3 and 4. As with the systems of FIGS. 3 and 4, the difference between FIGS. 5A and 5B lies only in the necessity for developing a maximum speed signal for propulsion and a minimum speed signal for braking. In FIG. 5A, a true vehicle speed $V_T$ is provided from a lowest speed axle or from an idler wheel or from a ground speed sensor (radar, e.g.) in a well known manner. The speed signal $V_T$ is summed with a wheel slip limit signal $W_S$ in summing circuit 130. The wheel slip limit $W_S$ may be a selected fixed slip speed or a variable slip speed as a function of actual vehicle speed. This wheel slip limit is selected based upon prior knowledge of the amount of slip desired to provide the maximum tractive effort, it being well known that there is a relatively low limit value of slip speed at which peak tractive or braking effort is realized. This value is a variable that depends on the condition of the rail on which the vehicle is operating as well as being speed dependent.

The sum of the true vehicle wheel speed $V_T$ and the wheel slip limit $W_S$ represents a maximum vehicle speed limit. This limit value is applied to another minimum signal select circuit 132. Note that in FIG. 5B, circuit 132A selects the maximum of the two input signals (rather than the minimum) to develop $V_{SMN}$. A second input to circuit 132 is a vehicle rate of change signal from summing junction 134. The rate of change signal is the summation of vehicle acceleration and the vehicle maximum speed signal $V_{SM}$ developed at the output of minimum select circuit 132. The select circuit 132 sets the $V_{SM}$ signal at either the minimum of the maximum vehicle speed limit or the rate of change of the limit signal. Appropriate compensation is provided by feedback block 136 which couples the $V_{SM}$ signal to junction 134. It is noted that the $V_{SM}$ signal is properly scaled to compensate for wheel diameters and gear ratios which affect the required rotational velocity of motors M1–M4.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A method for inhibiting wheel slip in an electric alternating current induction motor powered vehicle including electric power control means comprising the steps of:

determining a vehicle speed:

converting the vehicle speed to a torque command signal;

estimating relatively positive and negative torque command limits using the vehicle speed and a maximum allowable vehicle speed:

comparing the torque command signal to the positive and negative torque command limits to develop a torque reference signal limited to a maximum value corresponding to a respective one of the positive and negative torque command limits;

subtracting the magnitude of the signal corresponding to actual motor torque from the magnitude of the torque reference signal to develop a torque error signal;

converting the torque error signal to a corresponding torque regulator signal;

summing the torque regulator signal with the torque reference signal to develop a motor torque signal;

converting the motor torque signal to a corresponding frequency command signal: and obtaining, from the electric power control means, an excitation frequency for the induction motor corresponding to the frequency command signal.

2. A method for inhibiting wheel slip in an electric alternating current (AC) induction motor powered vehicle, the vehicle including excitation control means for supplying controlled frequency excitation to motors driving the vehicle, the method comprising the steps of:

determining actual vehicle speed;

selecting a speed limiting value from the most limiting of (1) a sum of actual vehicle speed converted to actual wheel speed plus a desired wheel slip and (2) a rate of change of wheel speed;

comparing actual wheel speed to the speed limiting value; and maintaining actual wheel speed less than the speed limiting value by varying excitation frequency in response to said comparing step.

3. The method of claim 2 and including the further steps of:

developing a torque command signal representative of a torque required to propel the vehicle at a preselected speed; and limiting the magnitude of the torque command signal to a range defined between a torque slip positive maximum value and a torque slip negative maximum value.

4. The method of claim 3 and including the additional steps of:

combining the torque command signal with a signal representative of actual motor torque for developing a torque error signal representative of a difference therebetween;

converting the torque error signal to a torque regulator signal suitable for enabling a motor torque corresponding to the commanded torque; and limiting the torque regulator signal to a value within a range between values corresponding to maximum allowable positive and negative slip frequencies for the motor of the vehicle.

5. The method of claim 4 and including the further step of summing the torque regulator signal with the torque command signal for developing a torque signal for energizing the motor.

6. The method of claim 5 and including the further step of converting the torque signal to a slip frequency command signal for energizing the motor at an excitation frequency corresponding to the torque command signal.

7. The method of claim 3 wherein said limiting step includes the sub-steps of:

developing a velocity error signal representative of a difference between a maximum allowable wheel velocity and actual wheel velocity;

summing the velocity error signal with a signal representative of a wheel slip corresponding to the commanded torque for developing a slip limit signal; and converting the slip limit signal to a corresponding one of the torque slip positive maximum and torque slip negative maximum values.

8. The method of claim 7 and including the further step of comparing the slip limit signal to a motor slip maximum allowable value signal and selecting a most limiting one of the signals for use in the converting step.

9. The method of claim 8 and including the further step of summing each of the torque slip positive maximum value and the torque slip negative maximum value with the limited torque command signal for developing a difference therebetween in each instance representative of a corresponding one of the values of the maximum allowable positive and negative slip frequencies.

10. The method of claim 7 wherein the step of developing a velocity error signal includes the further steps of summing actual wheel velocity with a selected wheel slip velocity for developing the maximum allowable wheel velocity.

11. The method of claim 10 and including the further step of:

summing a signal representative of vehicle wheel acceleration with a signal representative of the maximum allowable wheel velocity for developing a signal representative of a rate of change of wheel speed; and selecting the minimum of the rate of change of wheel speed and the maximum allowable wheel velocity for comparison with the actual wheel velocity for developing the velocity error signal.

\* \* \* \* \*